United States Patent
Higginbotham et al.

(10) Patent No.: US 12,356,897 B2
(45) Date of Patent: Jul. 15, 2025

(54) PHOTOPERIOD MANIPULATION

(71) Applicant: FLUENCE BIOENGINEERING, INC., Austin, TX (US)

(72) Inventors: Matthew Travis Higginbotham, Anderson, SC (US); Timothy Knauer, Charlotte, NC (US)

(73) Assignee: FLUENCE BIOENGINEERING, INC., Austin, TX (US)

( * ) Notice: Subject to any disclaimer, the term of this patent is extended or adjusted under 35 U.S.C. 154(b) by 247 days.

(21) Appl. No.: 17/917,108

(22) PCT Filed: Mar. 25, 2021

(86) PCT No.: PCT/US2021/024147
§ 371 (c)(1),
(2) Date: Oct. 5, 2022

(87) PCT Pub. No.: WO2021/211276
PCT Pub. Date: Oct. 21, 2021

(65) Prior Publication Data
US 2023/0148482 A1 May 18, 2023

Related U.S. Application Data

(60) Provisional application No. 63/009,520, filed on Apr. 14, 2020.

(51) Int. Cl.
*H05B 47/10* (2020.01)
*A01G 7/04* (2006.01)
*H05B 47/16* (2020.01)

(52) U.S. Cl.
CPC .............. *A01G 7/045* (2013.01); *H05B 47/16* (2020.01)

(58) Field of Classification Search
CPC ......... H05B 47/10; H05B 47/16; A01G 7/045
See application file for complete search history.

(56) References Cited

U.S. PATENT DOCUMENTS

| | | | |
|---|---|---|---|
| 10,034,358 B1 | 7/2018 | Chen | |
| 2013/0258684 A1* | 10/2013 | Yang | A01G 9/249 362/386 |
| 2015/0061510 A1* | 3/2015 | Maxik | A01G 7/045 315/153 |
| 2015/0089866 A1* | 4/2015 | Abbott | A01G 9/00 315/307 |
| 2019/0082613 A1* | 3/2019 | Eisele | H05B 47/115 |
| 2019/0098715 A1 | 3/2019 | Dodson et al. | |
| 2020/0404859 A1 | 12/2020 | Graves et al. | |

FOREIGN PATENT DOCUMENTS

| | | |
|---|---|---|
| JP | 2005151850 A | 6/2005 |
| JP | 2009000025 A | 1/2009 |
| JP | 2013099266 A | 5/2013 |
| JP | 2014033622 A | 2/2014 |
| WO | 2017192566 A1 | 11/2017 |

* cited by examiner

Primary Examiner — Jimmy T Vu

(57) ABSTRACT

The systems and methods disclosed herein include an apparatus that includes a user interface configured to receive user input, and a photoperiod controller configured to calculate a photoperiod schedule for one or more plants based on the user input and generate control signals that adjust light output of at least one luminaire to implement the photoperiod schedule.

17 Claims, 3 Drawing Sheets

PHOTOPERIOD MANIPULATION

CROSS-REFERENCE TO PRIOR APPLICATIONS

This application is the U.S. National Phase application under 35 U.S.C. § 371 of International Application No. PCT/US2021/024147, filed on Mar. 25, 2021, which claims the benefit of U.S. Patent Application No. 63/009,520, filed on Apr. 14, 2020. These applications are hereby incorporated by reference herein.

TECHNICAL FIELD

The subject matter of this disclosure is generally related to lighting, and more particularly to lighting systems for horticulture.

BACKGROUND

Luminaires and artificial light sources that emit light suitable for photosynthesis in plants are known. Sometimes referred to as "grow lights," they may, but do not necessarily, generate light with a characteristic spectra like that of the sun. Grow lights may be based on a variety of technologies including but not limited to incandescent, fluorescent, and LED (light-emitting diode). A typical implementation may include a timer that automatically turns the grow lights on and off at set times each day to control the number of hours of daily exposure of the plants to the generated light.

Photoperiod refers to the period of time each day during which an organism receives light or does not receive light. Photoperiodism is a plant's response to the duration of the day (light period) in combination with the duration of the night (dark period). This phenomenon influences different plant responses such as stage of development, reproduction (flowering), vegetative growth, and dormancy. This discovery led to the creation of photoperiod classes of plants by their response to the duration of daylength. The photoperiod classes include short day plants, long day plants, day length neutral plants, intermediate day length plants, and dual induction plants. These classes are the most studied and commercially produced.

A plant's photoperiod response is dependent not only on the time of the year (natural day lengths), but also its stage of growth. For example, long-day plants (plants that initiate flowering when having a short day preceded by a long day) stay vegetative under long days (16-18 hours of day length along with 6-8 hours of darkness). This may be annotated as 18/6 or 16/8. When long day plants transition into the flowering stage of production, the light period, or rather the dark period changes to 12 hours, and the light period is then also 12 hours. Thus, this plant has received a "long-day" for a specific period of time and then is given a "short-day" for a specific period of time. This combination of lighting durations over time causes the plant to initiate flowering and reproduction in long-day plants. Most plant types are photoperiod dependent. In photoperiod-dependent plants, exposure to very specific periods of light timing is what triggers various plants to enter their life cycle phases. Plant cultivars have commonly been bred to require very specific photoperiod durations in order to produce a bountiful harvest during a specific seasonal production window. Some plants do not respond to the photoperiod when they are in a very young (juvenile) stage, as at this stage the plant has yet to have the ability to proper perceive daylength. Such plants simply produce flowers based on their age and not light exposure, and these are termed day-neutral plants.

It is important that each plant is exposed to sufficient illumination based on its photoperiod class, but not excessive illumination. For example, long-day plants require days that are longer than their critical day length in order to prevent reproduction. Short-day plants will flower on shorter day lengths (longer dark period) when preceded by long days (short dark periods). In indoor farming environments, a plant's photoperiod has to be recreated due to the lack of a natural day/night cycle. The photoperiod is thus artificial. Generally, this has been done manually. However, this requires a lot of work by the grower in order to make sure each plant receives enough day light per day based on its photoperiod class and stage of growth. Thus what is needed in the art are more efficient methods of applying and manipulating photoperiod in an indoor farming environment to maximize production efficiently.

SUMMARY

All examples, aspects and features mentioned in this document can be combined in any technically possible way. Various implementations described herein include [TBD].

These and other features will be understood better by reading the following detailed description, taken together with the figures herein described. The accompanying figures are not intended to be drawn to scale. Each identical or nearly identical component that is illustrated in various figures may be represented by a like numeral. For purposes of clarity, not every component may be labeled in every figure.

These and other features of the present implementations will be understood better by reading the following detailed description, taken together with the figures herein described. The accompanying drawings are not intended to be drawn to scale. For purposes of clarity, not every component may be labeled in every drawing.

DETAILED DESCRIPTION

Figure 1:
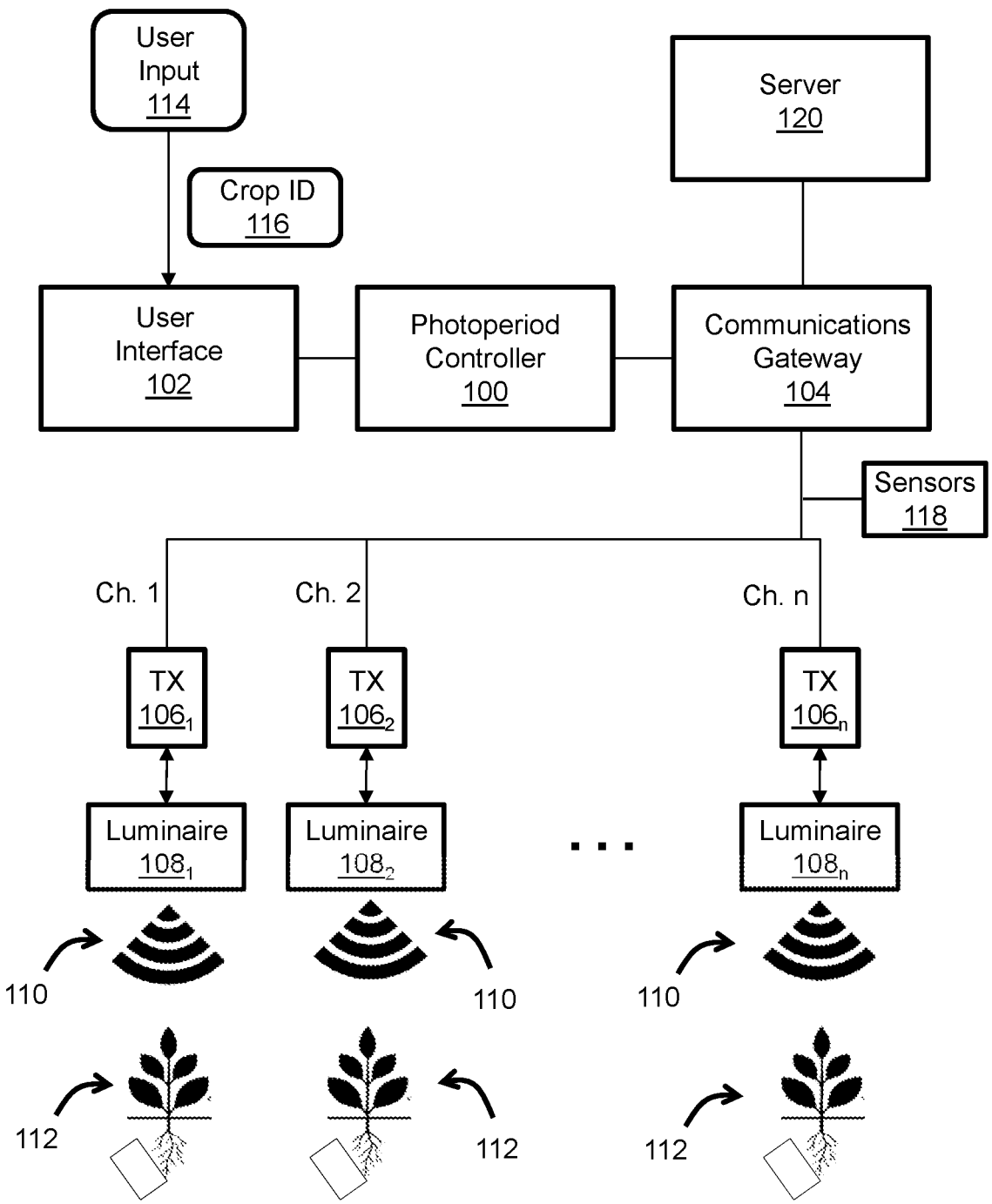
FIG. 1 is a block diagram of a lighting system for photoperiod manipulation in accordance with various implementations.

FIG. 1 is a block diagram of a lighting system for photoperiod manipulation in accordance with various implementations. The lighting system may include a photoperiod controller 100, a user interface 102, a communications gateway 104, transceivers 1061 through 106n, luminaires 1081 through 108n, and one or more sensors 118. The photoperiod controller 100 may include any of a wide variety of computing devices with processors, volatile memory, and non-volatile storage. In some implementations the photoperiod controller 100 includes a PLC (programmable logic controller) that has been ruggedized and adapted for use in wet and humid environments. The user interface 102 may include one or more of a touchscreen, keyboard, mouse, and display for interfacing with a photoperiod control program running on the photoperiod controller 100. The communications gateway 104, which is connected to the photoperiod controller, may include a wide variety of network devices including, but not limited to, switches, routers, and wireless access points. The transceivers 1061 through 106n may include a wide variety of network devices including, but not limited to, switches, routers, and WLAN (wireless local area network) interface cards and devices. The communications gateway and transceivers may be part of a communications network. Wireless or wireline communication links are maintained between the communications gateway 104 and the transceivers 1061 through 106n. The luminaires 1081 through 108n, each of which is connected to a corresponding transceiver, emit light suitable for photosynthesis in plants. The luminaires are configurable to emit light at multiple different selectable levels of light output (e.g., light intensity, light wavelength, irradiance) in response to signals from the photoperiod controller 100.

In response to user input 114 provided via the user interface 102 the photoperiod controller 100 may calculate and implement a photoperiod schedule for the plants 112. A photoperiod schedule may be, for example, a daily illumination duration for the plants 112 over a number of time periods (e.g., weeks) and/or growth stages of the plants 112. The photoperiod schedule may also include a schedule of light output levels (e.g., light intensity, light wavelengths, irradiance) for each time period. For example, a photoperiod schedule may include a plurality of time periods (e.g., weeks) and/or growth stages, and a photoperiod duration for each time period/growth stage (e.g., 12 hours illumination/day), as further described with respect to FIG. 2. The user input 114 may include a crop ID (identification) 116 that indicates one or more of the genus, species, variety, and cultivar of the plants that are grown. The photoperiod schedule may be specific to the plant, and so by selecting the crop ID the photoperiod controller 100 may link the proper photoperiod schedule to the plants 112 associated with the selected crop ID. In some implementations the crop ID is selected from a menu presented on the user interface 102. The user input 114 may also include climate parameters, duration of the growth stage, duration of the photoperiod cycle, and one or more time periods with corresponding irradiance deltas. The photoperiod controller 100 calculates a photoperiod schedule for the plants 112 based on the crop ID 116 and adjusts the photoperiod schedule based on the other user input (if any). The photoperiod controller 100 then controls the light output of the luminaires 1081 through 108n over a period, e.g. days or weeks, by sending control signals via the communications gateway 104 and transceivers 1061 through 106n to adjust light output 110 of the luminaires 1081 through 108n to implement the photoperiod schedule.

The photoperiod controller 100 may also receive input from one or more sensors 118. The sensors 118 may include, for example, humidity sensors, ambient light sensors, solar radiation sensors, temperature sensors, pressure sensors, water quality sensors (e.g., pH sensors), image or optical sensors, laser scanners, spectroscopy sensors, near-infrared sensors, time of flight sensors, depth ranging sensors, air quality sensors, acoustic sensors, air composition sensors, soil or mineral sensors and any other type of environmental sensors. The photoperiod controller 100 may adjust the photoperiod schedule based on the sensor input. This can be done when initially calculating the photoperiod schedule, and also while the photoperiod schedule is being implemented, so that there is real-time, dynamic adjustment to the photoperiod schedule. For example, light sensors may detect solar radiation entering from windows in an indoor farming environment and irradiating the plants. The photoperiod controller 100 may adjust the light output of the luminaires to account for the solar radiation so that the plants are irradiated consistent with the original photoperiod schedule. The photoperiod controller 100 can also adjust the photoperiod schedule based on user input received during implementation of the photoperiod schedule.

In some implementations, the photoperiod controller 100 may be in communication with a server 120 via the communications gateway 104. For example, the server 120 may be a cloud server that connects to the photoperiod controller 100 over a wide area network (e.g., the Internet) or a local area network. In some implementations, the photoperiod controller 100 may transmit the user and sensor input to the server 120, and the server 120 calculates and adjusts the photoperiod schedule. The server 120 may then transmit the photoperiod schedule back to the photoperiod controller 100, which generates control signals to implement the photoperiod schedule and transmits the control signals to the luminaires 108.

Figure 2:
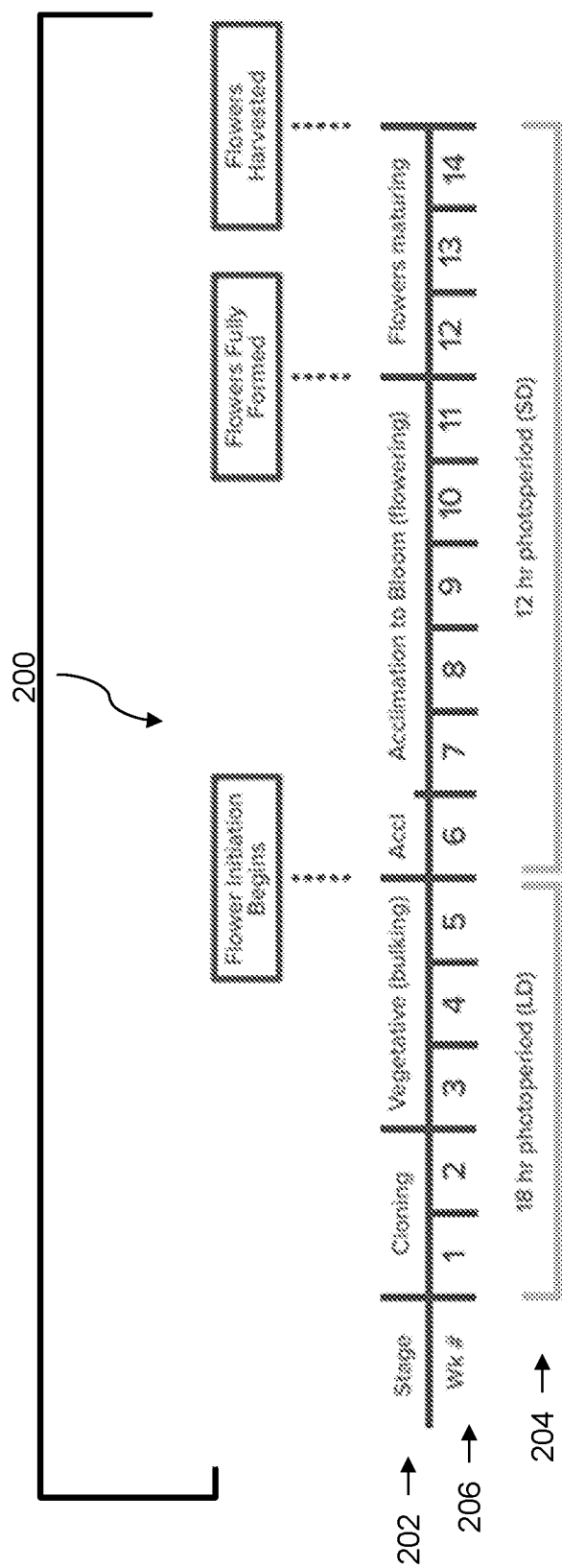
FIG. 2 illustrates a photoperiod schedule in accordance with various implementations.

FIG. 2 illustrates a photoperiod schedule 200 in accordance with various implementations. The illustrated photoperiod schedule is in a human-readable form. A corresponding computer-readable form of the photoperiod schedule may be created in any suitable data structure. The crop cycle includes growth stages 202 such as cloning, vegetative, acclimation to bloom, and flowers maturing. The photoperiod schedule also includes a number of time periods 206, which in the example of FIG. 2 are weeks. Each week is associated with a growth stage 202. For example, as illustrated in FIG. 2, the cloning stage is associated with weeks 1-2, the vegetative stage is associated with weeks 3-5, the acclimation to bloom stage is associated with weeks 6-11, and the flowering stage is associated with weeks 12-14.

Each time period 206 is also associated with a daily photoperiod time 204. For example, weeks 1-5 (i.e., the cloning and vegetative stages) are associated with a photoperiod of 18 hours/day, while weeks 6-14 (i.e., the acclimation to blooming and flowering stages) are associated with a photoperiod of 12 hours/day. Thus the photoperiod schedule 200 specifies the daily photoperiod duration for a specific crop through its growth stages.

The photoperiod schedule 200 may also specify the irradiance for each time period 206 as well. In some implementations, the photoperiod schedule 200 may be combined with a photoacclimation schedule, which changes the irradiance over time periods 206 in order to allow for plants to acclimate to new irradiance targets. Light energy or irradiance for plants may be measured as PAR (photosynthetic active radiation), with light falling onto a surface of the plant measured as PPFD (photosynthetic photon flux density) in units of $\mu mol/m^2/s$.

Referring again to FIG. 1, each luminaire 1081 through 108n may be individually controllable by the photoperiod controller 100. For example, luminaire 1081 may be associated with channel 1 (Ch. 1) and luminaire 1062 may be associated with independently controlled channel 2 (Ch. 2). In some implementations different channels are used to implement different photoperiod schedules for different types of plants, e.g. plants having different crop IDs. In some implementations different channels are used to implement the same photoperiod schedule for plants that have the same crop ID but are at different stages of the crop cycle. For example, channel 1 could be in the vegetative growth stage while channel 2 is in the flowering stage.

Figure 3:
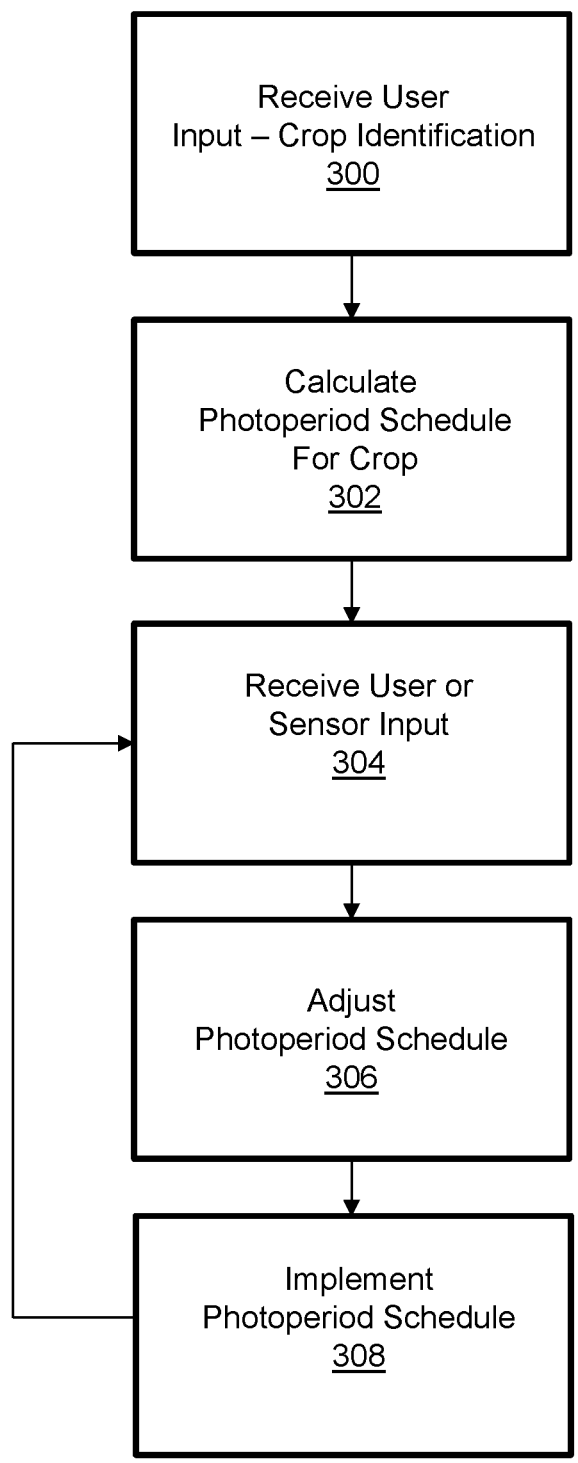
FIG. 3 illustrates a process for photoperiod manipulation in accordance with various implementations.

FIG. 3 illustrates a process for photoperiod manipulation in accordance with various implementations. Some or all steps may be partially or wholly implemented by the photoperiod program running on the photoperiod controller, and/or a server connected to the photoperiod controller. Step 300 includes receiving the crop ID as user input. The crop ID indicates one or more of genus, species, variety, and cultivar of the plants to be grown. Step 302 includes calculating the photoperiod schedule based on the crop ID. Step 304 includes receiving user input and/or sensor input. The input may include sensor data, climate parameters, duration of growth stage, duration of crop cycle, and one or more time periods with corresponding irradiance deltas. Step 306 includes adjusting the photoperiod schedule based on the received user and/or sensor inputs. In some implementations, there may not be any additional user or sensor input, and so steps 304 and 306 may be skipped.

Step 308 includes implementing the photoperiod schedule by controlling the luminaires to emit light output at levels in accordance with the photoperiod schedule. For example, the photoperiod may transmit control signals to the luminaires via the communications gateway, and the luminaires may adjust their respective light output levels according to the photoperiod schedule. The method may then return to step 304, in which the photoperiod controller may receive user and/or sensor input during implementation of the photoperiod schedule. The photoperiod controller may adjust the photoperiod schedule based on the user and/or sensor input, and implement the adjusted photoperiod schedule. This allows for a photoperiod system that dynamically adjusts based on real-time events (e.g., changes in grow environment, user intervention).

The methods and systems described herein are not limited to any hardware or software configuration and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors and may be stored on one or more storage medium readable by the processor (including volatile and non-volatile memory and/or storage elements), one or more input devices, and/or one or more output devices. The processor thus may access one or more input devices to obtain input data and may access one or more output devices to communicate output data. The input and/or output devices may include one or more of the following: SSD (solid state drive), HDD (hard disk drive), RAM (Random Access Memory), RAID (Redundant Array of Independent Disks), floppy drive, CD (compact disk), DVD (digital video disk), magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some implementations, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

Several features, aspects, implementations and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus, comprising:
   a user interface configured to receive user input, the user input including at least a crop identifier indicating at least one of a plant genus, species, variety, and cultivar; and
   a photoperiod controller configured to:
   calculate a photoperiod schedule for one or more plants based on the user input, wherein the photoperiod schedule comprises a plurality of time periods and/or growth stages for the one or more plants, and a photoperiod duration for each of said time periods and/or the growth stages;
   adjust the photoperiod schedule based on additional user input, the additional user input including at least one of climate parameters, duration of a growth stage, duration of a photoperiod cycle, and one or more time periods with corresponding irradiance deltas;
   generate control signals that adjust light output of at least one luminaire to implement the photoperiod schedule; and
   transmit the control signals to the at least one luminaire via a communications gateway connected to the photoperiod controller, the communications gateway communicatively coupled to a plurality of luminaires over a network.

2. The apparatus of claim 1, wherein the additional user input is said climate parameters.

3. The apparatus of claim 1, wherein the photoperiod controller is further configured to adjust the photoperiod schedule based on further input from at least one sensor.

4. The apparatus of claim 3, wherein the photoperiod controller is further configured to dynamically adjust the photoperiod schedule during implementation of the photoperiod schedule based on the further input.

5. The apparatus of claim 1, wherein the photoperiod schedule further comprises PPFD (photosynthetic photon flux density) values for each of the plurality of time periods.

6. The apparatus of claim 1, wherein the photoperiod controller is further configured to:
   transmit the user input to a server; and
   receive the photoperiod schedule from the server, wherein the server calculates the photoperiod schedule.

7. A method, comprising:
   receiving, via a user interface of a controller, user input, the user input including at least a crop identifier indicating at least one of a plant genus, species, variety, and cultivar, for generating a photoperiod schedule for one or more plants;
   calculating the photoperiod schedule based on the user input, wherein the photoperiod schedule comprises a plurality of time periods and/or growth stages for the one or more plants, and a photoperiod duration for each of said time periods and/or the growth stages;
   adjusting the photoperiod schedule based on additional user input, the additional user input including at least one of climate parameters, duration of a growth stage, duration of a photoperiod cycle, and one or more time periods with corresponding irradiance;
   generating control signals that adjust light output of at least one luminaire to implement the photoperiod schedule; and
   transmitting the control signals to the at least one luminaire via a communications gateway connected to the controller, the communications gateway communicatively coupled to a plurality of luminaires over a network.

8. The method of claim 7, wherein the additional user input is said climate parameters.

9. The method of claim 7, further comprising:
   adjusting the photoperiod schedule based on further input from at least one of a user and a sensor.

10. The method of claim 9, wherein adjusting the photoperiod schedule comprises dynamically adjusting the photoperiod schedule during implementation of the photoperiod schedule based on the further input.

11. The method of claim 7, wherein the photoperiod schedule further comprises PPFD (photosynthetic photon flux density) values for each of the plurality of time periods.

12. The method of claim 7, further comprising:
   transmitting the control signals to the at least one luminaire; and
   adjusting, by the at least one luminaire, the light output of the at least one luminaire according to the photoperiod schedule.

13. The method of claim 7, wherein:
   the controller transmits the user input to a server;
   the server calculates the photoperiod schedule and transmits the photoperiod schedule to the controller; and
   the controller generates the control signals based on the photoperiod schedule.

14. A system, comprising:
   a photoperiod controller configured to generate control signals based on a photoperiod schedule and transmit the control signals to at least one luminaire via a communications gateway connected to the photoperiod controller, the communications gateway communicatively coupled to a plurality of luminaires over a communications network;
   a user interface configured to receive a user input and an additional user input to the photoperiod controller, the photoperiod schedule based on the user input and the additional user input, wherein the photoperiod schedule comprises a plurality of time periods and/or growth stages for one or more plants, and a photoperiod duration for each of said time periods and/or the growth stages, the user input including at least a crop identifier indicating at least one of a plant genus, species, variety, and cultivar;

the plurality of luminaires configured to emit light suitable for photosynthesis in plants at a plurality of different selectable levels of light output; and the communications network via which the control signals are provided to the plurality of luminaires, the plurality of luminaires adjusting the light output in response to the control signals.

15. The system of claim 14, wherein the photoperiod controller is further configured to adjust the photoperiod schedule based on further input from at least one of a user and a sensor.

16. The system of claim 14, further comprising a server communicatively coupled to the photoperiod controller via the communications network, wherein:

the photoperiod controller is further configured to transmit the user input and the additional user input to the server and receive the photoperiod schedule from the server; and the server is configured to calculate the photoperiod schedule based on the user input.

17. The system of claim 16, wherein the server is further configured to adjust the photoperiod schedule based on further input from at least one of a user and a sensor.

* * * * *